United States Patent
Cheng et al.

(10) Patent No.: US 9,794,828 B2
(45) Date of Patent: Oct. 17, 2017

(54) RADIO UNIT, BASEBAND PROCESSING UNIT AND BASE STATION SYSTEM

(71) Applicant: International Business Machines Corporation, Armonk, NY (US)

(72) Inventors: Xinhao Cheng, Shanghai (CN); Mingqiang Li, Beijing (CN); Yonghua Lin, Beijing (CN); Qing Wang, Beijing (CN); Chao Xue, Beijing (CN); Rong Yan, Beijing (CN); Hai Zhan, Beijing (CN); Chao Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 14/855,463

(22) Filed: Sep. 16, 2015

(65) Prior Publication Data

US 2016/0007231 A1    Jan. 7, 2016

Related U.S. Application Data

(60) Division of application No. 13/927,931, filed on Jun. 26, 2013, now Pat. No. 9,220,004, which is a continuation of application No. 13/899,939, filed on May 22, 2013, now Pat. No. 9,220,003.

(30) Foreign Application Priority Data

May 31, 2012 (CN) .......................... 2012 1 0177166

(51) Int. Cl.
*H04W 28/06* (2009.01)
*H04W 4/18* (2009.01)
*H04L 29/06* (2006.01)
*H04W 8/00* (2009.01)
*H04W 72/04* (2009.01)
*H04W 24/02* (2009.01)

(52) U.S. Cl.
CPC ............. *H04W 28/06* (2013.01); *H04L 69/04* (2013.01); *H04W 4/185* (2013.01); *H04W 8/00* (2013.01); *H04W 72/042* (2013.01); *H04W 24/02* (2013.01)

(58) Field of Classification Search
None
See application file for complete search history.

(56) References Cited

U.S. PATENT DOCUMENTS

| 6,754,265 | B1 | 6/2004 | Lindemann | |
| 7,920,590 | B2 | 4/2011 | Le et al. | |
| 2002/0038385 | A1* | 3/2002 | Kalliokulju | H04L 29/06 709/247 |
| 2002/0159516 | A1 | 10/2002 | Baker et al. | |

(Continued)

FOREIGN PATENT DOCUMENTS

| CN | 102255692 A | 11/2011 |
| CN | 102291566 A | 12/2011 |
| WO | 2011157165 A2 | 12/2011 |

*Primary Examiner* — Candal Elpenord
(74) *Attorney, Agent, or Firm* — Cantor Colburn LLP

(57) ABSTRACT

A radio unit configured to connect to a baseband processing unit includes a transformation unit configured to obtain uplink time domain signal data and transform the uplink time domain signal data into uplink frequency domain signal data; and a compression unit configured to compress the uplink frequency domain signal data by using a compression algorithm.

8 Claims, 7 Drawing Sheets

(56) References Cited

U.S. PATENT DOCUMENTS

| | | | |
|---|---|---|---|
| 2004/0125793 A1* | 7/2004 | Yi | H04W 28/18 370/352 |
| 2006/0262812 A1* | 11/2006 | Liu | H04L 29/06027 370/477 |
| 2008/0268785 A1 | 10/2008 | McCoy et al. | |
| 2009/0086707 A1 | 4/2009 | Meylan | |
| 2011/0030025 A1 | 2/2011 | Bertonis et al. | |
| 2011/0149790 A1* | 6/2011 | Mabuchi | H04L 1/0034 370/252 |
| 2011/0249790 A1* | 10/2011 | Bismuth | A61B 6/12 378/62 |
| 2012/0008696 A1 | 1/2012 | Wegener | |
| 2012/0224611 A1 | 9/2012 | Baheti et al. | |
| 2012/0250740 A1 | 10/2012 | Ling | |

* cited by examiner

RADIO UNIT, BASEBAND PROCESSING UNIT AND BASE STATION SYSTEM

DOMESTIC AND FOREIGN PRIORITY

This application is a divisional application of U.S. patent application Ser. No. 13/927,931, filed Jun. 26, 2013, which is a continuation of U.S. patent application Ser. No. 13/899,939, filed May 22, 2013, which claims priority to Chinese Patent Application No. 201210177166.1, filed May 31, 2012, and all the benefits accruing therefrom under 35 U.S.C. §119, the contents of which in its entirety are herein incorporated by reference.

BACKGROUND

The present invention relates to a communication base station, and more specifically, to a base station system and a radio unit and a baseband processing unit therein.

Wireless communication technology develops rapidly in recent years, and a base station system can provide users with various enhanced services via wireless communication.

FIG. 1 shows a structural diagram of a typical base station system. As shown in FIG. 1, the base station system comprises a radio unit 10 and a baseband processing unit 20. Generally, the radio unit 10 is remote from the baseband processing unit 20, and is therefore referred to as Remote Radio Unit. The base station system transmits and receives radio signal via the radio unit 10 so as to communicate with mobile terminals. Specifically, the radio unit 10 receives uplink data signal from mobile terminals via an antenna and a receiver, and converts analog uplink signal to digital signal via an Analog-to-Digital Converter (ADC). Then, the radio unit 10 transmits digitalized uplink data signal to the baseband processing unit 20 for further processing. In general, an adapter is also disposed between the radio unit 10 and the baseband processing unit 20 for exchanging and forwarding of data. The radio unit 10 transmits uplink data to the baseband processing unit via that adapter, which is not shown herein for brevity.

Since the baseband processing unit 20 typically performs baseband processing on signal in frequency domain, whereas what is directly obtained by the radio unit 10 is often signal in time domain, the baseband processing unit 20 usually comprises a Fourier Transformation Unit (DFT) for transforming uplink data signal in time domain obtained from the radio unit 10 into uplink data signal in frequency domain. Then, after the transformation by the DFT unit, the baseband processing unit 20 can conduct further baseband processing on uplink data signal in frequency domain. The above is the brief description for processing procedure of uplink data signal in the radio unit 10 and the baseband processing unit 20.

As to downlink processing, the downlink data signal after baseband processing is first obtained in the baseband processing unit 20, and transformed from frequency domain to time domain via an Inverse Fourier Transformation Unit (IDFT), and then the downlink data signal in time domain is sent to the radio unit 10. After obtaining the downlink data signal in time domain, the radio unit 10 first converts it into analog signal via a Digital-to-Analog Converter (DAC), then transmits the modulated signal to mobile terminals via the transmitter and antenna. Thus, via the above uplink and downlink, mobile terminals are capable of exchanging data with the base station system to realize communication.

As mentioned above, generally, the radio unit 10 is remote from the baseband processing unit 20, and therefore, the two usually communicate with each other via communication media such as optical fiber that is suitable for long-range communication. However, with the rapid development of communication technology in recent years, service provided and data traffic processed by the base station system increase exponentially. In particular, with the emergence of third and fourth generation mobile communication technology such as Long Term Evolution (LTE) and Long Term Evolution Advanced (LTE-A), radio spectrum width becomes larger and larger. Meanwhile, due to the ability of supporting advanced technology such as Multi-Input Multi-Output (MIMO), bandwidth required to transfer baseband signal between the baseband processing unit 20 and the remote radio unit 10 becomes larger and larger. Specifically, under LTE technology supporting spectrum width of 20 MHz and 2*2 MIMO, 2 Gbps transmission bandwidth is needed between the baseband processing unit and the radio unit. If the above technology is made to support 8*4 MIMO, then the bandwidth needed will be increased to about 8 Gbps. It can be anticipated that, with further improvement in Quality of Service, baseband signal traffic between the baseband processing and the radio unit will be further increased, which will bring huge pressure on communication bandwidth. Therefore, it is desirable to propose a solution that reduces communication bandwidth pressure between the baseband processing and the radio unit without reducing Quality of Service.

SUMMARY

A radio unit configured to connect to a baseband processing unit includes a transformation unit configured to obtain uplink time domain signal data and transform the uplink time domain signal data into uplink frequency domain signal data; and a compression unit configured to compress the uplink frequency domain signal data by using a compression algorithm.

In another embodiment, a baseband processing unit configured to connect to a radio unit includes a decompression module configured to obtain compressed uplink signal data from the radio unit and decompress the compressed uplink signal data; and a compression module configured to obtain baseband processed downlink frequency domain signal data, compress the downlink frequency domain signal data by using a compression algorithm, and transmit it to the radio unit.

In another embodiment, a method for processing uplink signal data in a base station system, the base station system comprising a radio unit and a baseband processing unit, includes obtaining, in the radio unit, uplink time domain signal data, and transforming it into uplink frequency domain signal data; compressing, in the radio unit, the uplink frequency domain signal data by using a compression algorithm; transmitting the compressed uplink frequency domain signal data from the radio unit to the baseband processing unit; and decompressing, in the baseband processing unit, the compressed uplink frequency domain signal data.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3A is signal data in time domain, and FIG. 3B is signal data in frequency domain obtained by performing Fourier transformation on the signal data of FIG. 3A;

DETAILED DESCRIPTION

Figure 1:
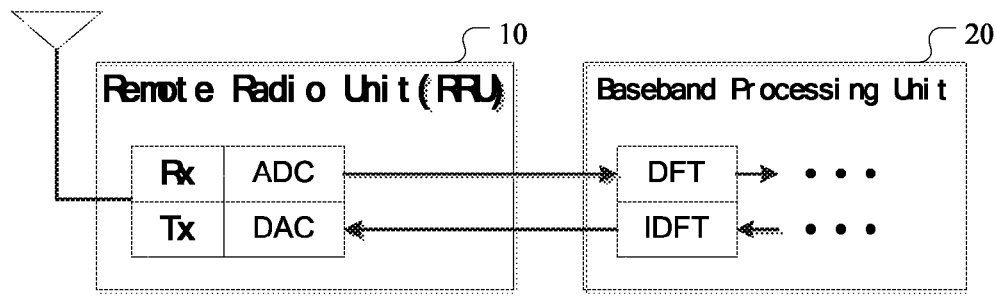
FIG. 1 shows a structural diagram of a typical base station system.

According to one embodiment of the present invention, there is provided a radio unit for connecting to a baseband processing unit, the radio unit comprising: a transformation unit configured to obtain uplink time domain signal data and transform it into uplink frequency domain signal data; a compression unit configured to compress the uplink frequency domain signal data by using a compression algorithm; a decompression unit configured to obtain compressed downlink signal data from the baseband processing unit and decompress the same; and an inverse transformation unit configured to obtain downlink time domain signal data by inversely transforming the decompressed downlink signal data.

According to another embodiment of the present invention, there is provided a baseband processing unit for connecting to a radio unit, comprising: a decompression module configured to obtain compressed uplink signal data from the radio unit and decompress the same; and a compression module configured to obtain baseband processed downlink frequency domain signal data, compress the same by using a compression algorithm, and transmit it to the radio unit.

According to another embodiment of the present invention, there is provided a base station system comprising the radio unit and the baseband processing unit of the foregoing embodiments.

According to yet another embodiment of the present invention, there is provided a method for processing uplink signal data in a base station system, the method comprising: obtaining, in a radio unit, uplink time domain signal data, and transforming it into uplink frequency domain signal data; compressing, in the radio unit, the uplink frequency domain signal data by using a compression algorithm; transmitting the compressed uplink frequency domain signal data from the radio unit to a baseband processing unit; and decompressing, in the baseband processing unit, the compressed uplink frequency domain signal data.

According to still another embodiment of the present invention, there is provided a method for processing downlink signal data in a base station system, the method comprising: compressing, in a baseband processing unit, downlink frequency domain signal data by using a compression algorithm; transmitting the compressed downlink frequency domain signal data from the baseband processing unit to a radio unit; decompressing, in the radio unit, the compressed downlink frequency domain signal data; and transforming, in the radio unit, the decompressed downlink frequency domain signal data into downlink time domain signal data.

With the embodiments of the invention, what is transferred between a radio unit and a baseband processing unit of a base station system is signal data that has been effectively compressed, thereby reducing data traffic transmitted and reducing bandwidth pressure on communication links.

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 2:
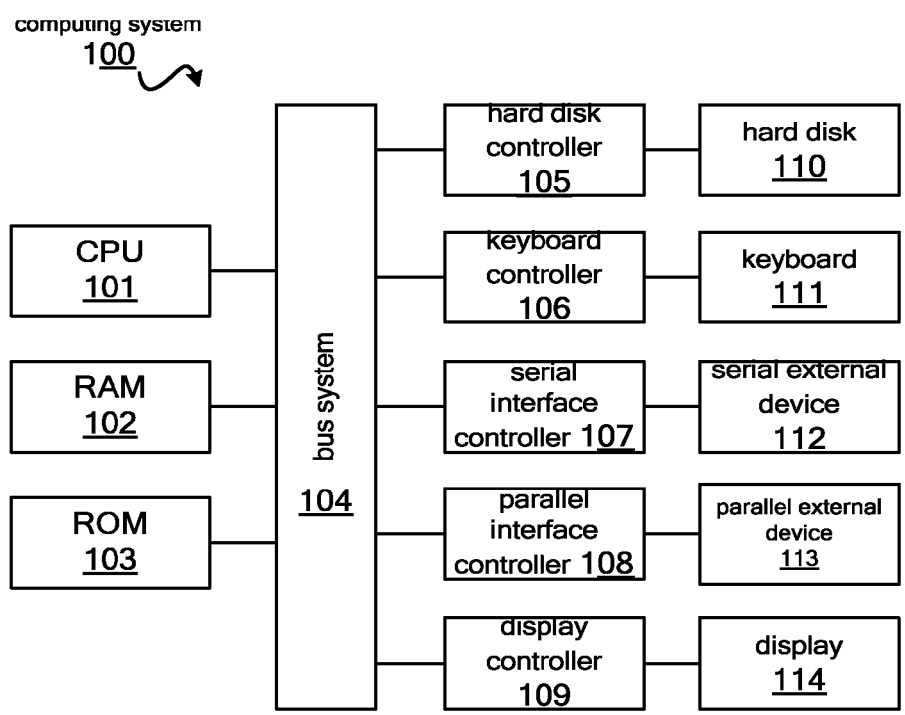
FIG. 2 shows a block diagram of an exemplary computer system which is applicable to implement the embodiments of the present invention.

FIG. 2 shows a block diagram of an exemplary computer system 100 which is applicable to implement the embodiments of the present invention. As shown in FIG. 2, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 2 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention will be described below in detail. In embodiments of the invention, to alleviate the pressure on communication bandwidth between a radio unit and a baseband processing unit, it is contemplated by the inventors that uplink data can be firstly compressed in the radio unit and then transmitted to the baseband processing unit, and is decompressed by the baseband processing unit for further baseband processing; while downlink data can be firstly compressed in the baseband processing unit and then transmitted to the radio unit, and is decompressed by the radio unit for further processing. Thus, what is transferred between the radio unit and the baseband processing unit is signal data that has been compressed, which significantly reduces data traffic transmitted and alleviates bandwidth pressure on long-range communication media.

Figure 3A:
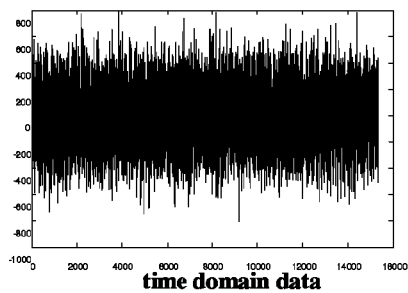
FIGS. 3A and 3B shows comparison in communication signal data, where
Figure 3B:
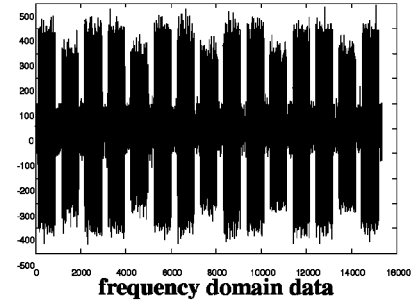

Further, to achieve higher data compression efficiency, the inventors have conducted an intensive study on features of signal data in wireless communication area. It has been found by the inventors through study that, signal data in frequency domain tends to have stronger regularity as compared to signal data in time domain. FIG. 3 shows comparison in communication signal data, wherein FIG. 3A is signal data in time domain, and FIG. 3B is signal data in frequency domain obtained by performing Fourier transformation on the signal data of FIG. 3A. It can be found by comparing the two types of signal data that, the signal data in time domain shown in FIG. 3A is relatively disordered, whereas the signal data in frequency domain shown in FIG. 3B presents very strong regularity, which is beneficial for achieving high data compression efficiency. Thus, it is further contemplated by the inventors that, data compression can be performed on signal in frequency domain, thereby increasing compression efficiency and further reducing data traffic transmitted. Embodiments of the above inventive concept will be described below in conjunction with accompanying drawings.

Figure 4:
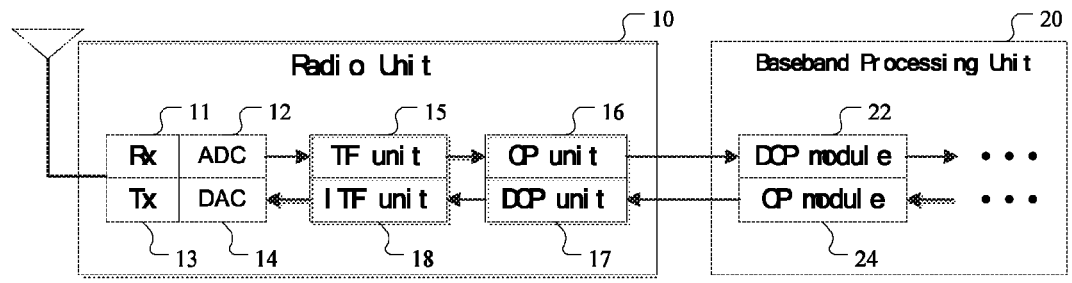
FIG. 4 shows a structural diagram of a base station system according to an embodiment of the invention.

With reference now to FIG. 4, which shows a structural diagram of a base station system according to an embodiment of the invention. Similar to FIG. 1, the base station system comprises a baseband processing unit 20 and a remote radio unit 10, except that both radio unit 10 and baseband processing unit 20 will compress baseband signal data before transmission thereof to alleviate transmission bandwidth pressure.

Specifically, the radio unit 10 comprises a receiver 11 and an Analog-to-Digital Converter (ADC) 12. The receiver 11 is configured to receive uplink data signal from mobile terminals via an antenna and supply it to the ADC 12. Then, the ADC 12 converts the analog signal obtained by the receiver 11 to digital signal to facilitate subsequent digital signal processing. Corresponding to the receiver 11 and ADC 12 for uplink data, the radio unit further comprises a transmitter 12 and a Digital-to-Analog Converter (DAC) 14 for downlink data. The DAC 14 is configured to obtain digitalized downlink signal and convert it to analog signal. The transmitter 13 modulates the analog signal and transmits downlink signal to mobile terminals via the antenna.

Unlike prior art, the radio unit 10 in FIG. 4 further comprises: a transformation unit (TF unit) 15 configured to obtain uplink time domain signal data and transform it into uplink frequency domain signal data; a compression (CP) unit 16 configured to compress the uplink frequency domain signal data by using a compression algorithm; a decompression (DCP) unit 17 configured to obtain compressed downlink signal data from the baseband processing unit and decompress the compressed downlink signal data; an inverse transformation (ITF) unit 18 configured to obtain downlink time domain signal data by inversely transforming the decompressed downlink signal data. These newly added units would be described below in further details.

The transformation unit 15 is coupled to the ADC 12 for obtaining digitalized uplink signal data therefrom. It is appreciated that, uplink signal data at this moment is signal data in time domain. As stated above, since signal data in frequency domain is more suitable for compression, uplink signal data in time domain is first transformed into uplink signal data in frequency domain by the transformation unit 15. Typically, the transformation unit 15 may utilize Fourier transformation, discrete Fourier transformation or fast Fourier transformation to perform time domain to frequency domain transformation. It is appreciated that, there are many other implementations for performing time domain to frequency domain transformation on signal in prior art, and these implementations may all be used to construct the transformation unit 15. In an alternative embodiment, the transformation unit 15 is further configured to perform pre-processing on uplink signal data before or after transformation to filter out obvious noise signal therein.

The compression unit 16 can perform compression using a compression algorithm on the signal data in frequency domain supplied by the transformation unit 15.

In one embodiment, in case that the transformation unit 15 does not conduct pre-processing, the compression unit 16 first conducts pre-processing on the obtained uplink signal in frequency domain to filter out noise therein before conducting compression on the data.

Specifically, the compression unit 16 may utilize a plurality of compression algorithms to realize compression of uplink signal data in frequency domain. In one embodiment, the compression unit 16 employs LZW compression algorithm to compress signal data in frequency domain. In the LZW compression algorithm, each data string that appears for the first time is placed into a string table and the string is represented by a digit. By employing a string table, the compressed file only stores therein digits rather than data strings, such that data traffic after compression is reduced as compared to original data traffic.

In one embodiment, the compression unit 16 employs Huffman compression algorithm to conduct compression of signal data in frequency domain. Huffman algorithm is a common lossless compression method, which uses binary description to replace each character in an original file, and length of the binary description is determined by occurrence frequency of corresponding character. Specifically, fewer bits are used to represent common character, and more bits are used to represent character with low occurrence frequency, such that total length of compressed binary bits is less than total length of original file when different occurrence frequency of different characters are considered.

In another embodiment, the compression unit 16 employs a floating-point compression method to conduct compression of signal data in frequency domain. In this method, the compression unit 16 divides a plurality of signal samples into a sequence of coded groups, and determines index value for each coded group and mantissa of each signal sample. Thereafter, the index value of coded group is encoded to determine an index tag, and then the signal sample is encoded with the above index tag and mantissa, thus forming compressed data.

In addition to the above illustrated compression algorithms, the compression unit 16 may also utilize other algorithms in the art to conduct compression, such as Run-Length Encoding (RLE) compression, arithmetic encoding compression, Lempel-Ziv (LZ77) compression etc. It is appreciated that, a person skilled in the art is capable of employing suitable compression algorithms to compress signal data in frequency domain as necessary; the employment of these algorithms and other or more compression algorithms are all within the scope of the inventive concept of the invention.

The inventors have conducted simulation experiment by compressing signal data in time domain and corresponding signal data in frequency domain respectively using a same compression algorithm (e.g., floating-point compression method). The simulation result indicates that, compression ratio of signal data in frequency domain is often 20% to 30% higher than that of signal data in time domain. Therefore, by firstly transforming uplink time domain signal into frequency domain signal with the transformation unit 15, then conducting compression with the compression unit 16, the radio unit 10 can obtain uplink signal data that is adequately compressed, and transmit such data to the baseband processing unit 20. Since it is adequately compressed uplink signal data that is transferred between the radio unit 10 and the baseband processing unit 20, data traffic transmitted has been significantly decreased, thus reducing bandwidth pressure on transmission links.

Corresponding to the above processing performed on uplink signal data by the transformation unit 15 and the compression unit 16, the decompression unit 17 and the inverse transformation unit 18 correspondingly conduct decompression and inverse transformation on downlink signal data.

Specifically, the decompression unit 17 obtains compressed downlink signal data from the baseband processing unit 20 and decompresses the compressed downlink signal data. The decompression method corresponds to the compression algorithm employed in compressing downlink signal data by the baseband processing unit 20. It is appreciated that, corresponding to uplink data, data obtained by the decompression unit 17 is in frequency domain. In this end, the inverse transformation unit 18 obtains decompressed downlink signal data in frequency domain from the decompression unit 17 and conducts inverse transformation on it, so as to obtain downlink signal data in time domain. The execution manner of the inverse transformation unit 18 is an inversion of that of the transformation unit 15, and the transformation from signal in frequency domain to signal in time domain is often realized by using manners such as inverse Fourier transformation etc. Thus, via the decompression unit 17 and the inverse transformation unit 18, the radio unit 10 obtains the needed downlink signal data in time domain. Further, via the DAC 14 and the transmitter 13, the above downlink signal data in time domain can be converted into modulated analog signal and transmitted to mobile terminals, thereby realizing communication of downlink data signal.

Implementations of respective units in the radio unit 10 have been described hereinabove, and next, structures and execution manners of corresponding baseband processing unit 20 will be described.

Referring again to FIG. 4, the baseband processing unit 20 comprises a decompression module 22 for uplink data and a compression unit 24 for downlink data. The decompression module 22 is configured to obtain compressed uplink signal data from the above radio unit 10 and decompress the compressed uplink signal data; the compression module 24 is configured to compress the downlink signal data in frequency domain by using a compression algorithm, and transmit it to the radio unit 10.

As mentioned above, via the transformation unit 15 and the compression unit 16 in the radio unit 10, uplink signal data is converted into data in frequency domain and is compressed. Thus, what is obtained by the decompression module 22 from the radio unit 10 is compressed uplink signal data in frequency domain. For such signal data, the decompression module 22 needs to employ a decompression algorithm corresponding to the compression algorithm employed by the radio unit 10 to conduct data decompression. After decompression, the decompression module 22 can provide decompressed uplink signal data in frequency domain. In addition, it has been mentioned that, the baseband processing unit 20 generally conducts baseband processing on signal in frequency domain. Since the radio unit 10 of FIG. 4 has completed the transformation of uplink signal from time domain to frequency domain, and the baseband processing unit 20 has directly obtained frequency-domain signal, the baseband processing unit 20 does not need to contain a transformation unit that conducts time domain to frequency domain transformation as in the prior art did; instead, it can directly perform further baseband processing on data in frequency domain provided by the decompression module 22. Such baseband processing includes extraction of user data in frequency domain, channel separation, channel estimation, measurement, MIMO decoding, demodulation, decode etc. These baseband processing processes are well known to those skilled in the art and description of which will be omitted here.

As to downlink signal data, the baseband processing unit 20 can firstly conduct conventional baseband processing on downlink data in frequency domain, then compress it by using the compression module 24. The compression module 24 may employ a variety of compression algorithms to perform compression of downlink data in frequency domain, as previously illustrated in describing the compression unit 15 in the radio unit 10. It is appreciated that, however, due to the independence between uplink and downlink, the compression algorithm employed by the compression module 24 in the baseband processing unit 20 when compressing downlink signal data may be same as or different from that employed by the compression unit 15 in the radio unit 10 when compressing uplink signal data. In addition, as stated above, since the radio unit 10 already contains therein an inverse transformation unit 18 for performing frequency domain to time domain transformation on downlink signal data, the baseband processing unit 20 can directly send downlink signal data in frequency domain compressed via the compression module 24 to the radio unit 10 without having to perform domain transformation. Again, since it is adequately compressed frequency domain downlink data that is transferred by the baseband processing unit 20, data traffic on downlink has been decreased, thus reducing bandwidth pressure on the link.

In the above embodiment, both the radio unit and the baseband processing unit compress signal data in frequency domain before transmission. Although in most cases, compression efficiency of signal data in frequency domain is higher than that of signal data in time domain, however in certain cases, signal in time domain is more suitable for compression. Thus, it is contemplated by the inventors that, the radio unit and the baseband processing unit are made to switch at proper time between frequency domain compression and time domain compression, thereby further increasing compression efficiency, and reducing data traffic between the radio unit and the baseband processing unit.

Figure 5A:
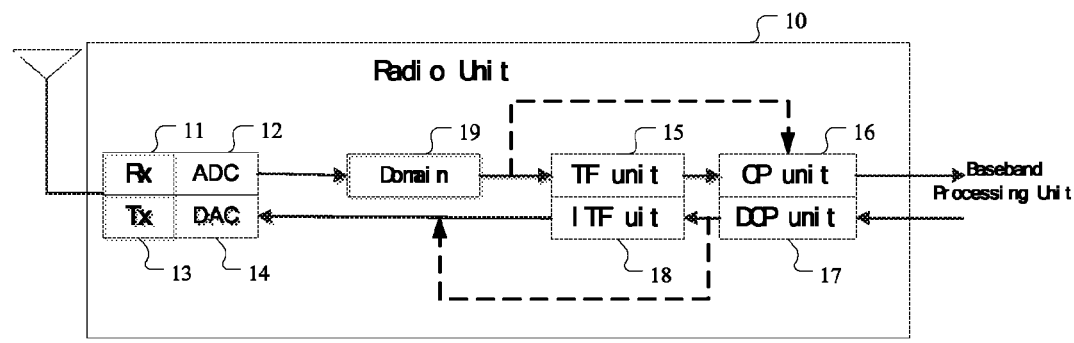
FIG. 5A shows a structural diagram of a radio unit according to an embodiment of the invention.

FIG. 5A shows a structural diagram of a radio unit according to an embodiment of the invention. As compared to FIG. 4, the radio unit 10 of FIG. 5A further comprises a domain determination unit 19 connected between the ADC 12 and the transformation unit 15. The domain determination unit 19 obtains digitalized uplink signal data from the ADC 12 and determines compression mode on which uplink data compression is based, that is, determines whether compression of uplink data should be conducted in time domain or in frequency domain.

In one embodiment, the domain determination unit 19 estimates compression ratio in time domain based on the obtained uplink time domain signal data; if the compression ratio is higher than a predetermined value T, it is determined that compression should be conducted in time domain, otherwise, it is determined that compression should be conducted in frequency domain. The estimation of the domain determination unit 19 on compression ratio is relevant to the compression algorithm employed by the compression unit 16. For example, if the compression unit 16 employs Huffman compression algorithm, then the domain determination unit 19 collects statistics about occurrence frequency of respective data in the obtained signal data in time domain, and estimates compression ratio based thereon. If the compression unit 16 employs floating-point compression method, then the domain determination unit 19 scans value range of the obtained data and estimates compression ratio based thereon. In case that the compression unit 16 employs other compression algorithms, the domain determination unit 19 accordingly obtains other parameters of uplink data and conducts estimation of compression ratio based thereon.

In one embodiment, the compression unit 16 also provides feedback about actual compression ratio to the domain determination unit 19. Here, the domain determination unit 19 may determine compression mode based on that feedback result. For example, if actual compression ratio that is feedback is lower than a predetermined value, then the domain determination unit 19 may determine to change compression mode.

Further, in one embodiment, the domain determination unit 19 conducts determination of domain mode based on estimation of compression ratio and feedback of actual compression ratio. Specifically, in an example, the domain determination unit 19 initially determines that compression should be conduct in frequency domain by default, and accordingly, the compression unit 16 feeds back actual compression ratio of frequency domain compression to the domain determination unit 19. For uplink data in time domain that arrives subsequently, the domain determination unit 19 estimates compression ratio on time domain as described above, and compares that ratio with compression ratio on frequency domain obtained via feedback. If actual compression ratio on frequency domain is lower than the estimated compression ratio on time domain for successive K sets of data (K is a preset value), then the domain determination unit 19 determines that compression should be conducted on time domain. In an example, the domain determination unit 19 determines that compression should be changed to frequency domain after compression of successive M set of data on time domain (M is a preset value). Alternatively, in another example, once estimated compression ratio in time domain or actual compression ratio in time domain obtained via feedback is lower than a predetermined value, the domain determination unit 19 determines that compression should be changed to frequency domain.

Those skilled in the art can appreciate that, based on estimation of compression ratio in time domain and/or feedback of actual compression ratio, the domain determination unit 19 may utilize more approaches to determine compression mode.

After proper compression mode has been determined, the domain determination unit 19 can notify result of compression mode determination to other units through various manners. In an example, the domain determination unit 19 sends a mode notification signal to the transformation unit 15 and the compression unit 16, so as to make them informed of the result of compression mode determination. In another example, the domain determination unit 19 adds a domain mode tag, i.e. a time domain mode tag or a frequency domain mode tag, for uplink signal data based on the determination result. The domain mode tag may be added to a predetermined location on each set of uplink signal data, such as occupying a particular reserved bit of the signal data, or being added to the beginning of the signal data as a prefix, etc.

In response to different results of compression mode determination, respective units within the radio unit 10 may have different execution manner. In an example, in response to the determination result of frequency domain compression mode, the domain determination unit 19 transmits uplink data in time domain to the transformation unit 15 and the compression unit 16, which conduct frequency domain transformation and compression on the uplink time domain signal data in a manner as described with reference to FIG. 4. In response to time domain compression mode, the domain determination unit 19 directly transmits uplink data in time domain to the compression unit 16 and bypasses the transformation unit 15. Accordingly, the compression unit 16 directly compresses the obtained uplink signal data in time domain.

In another example, the domain determination unit 19 always transmits uplink data to the transformation unit 15; however, the transformation unit 15 conditionally transforms the uplink data based on compression mode. Specifically, in response to frequency domain compression mode, the transformation unit 15 conducts time domain to frequency domain transformation in a manner as described with reference to FIG. 4. In response to time domain compression mode, the transformation unit 15 directly forwards uplink time domain signal to the compression unit 16 without conducting frequency domain transformation.

Further, the compression unit 16 compresses obtained uplink signal data in frequency domain or time domain. In case that the uplink signal data contains therein a domain mode tag, the compression unit 16 performs separate processing on the domain mode tag without conducting conventional compression.

Corresponding to the processing of the above uplink signal data, the decompression unit 17 and the inverse transformation unit 18 for downlink signal data are also configured to adapt to the two compression modes. Specifically, the decompression unit 17 and the inverse transformation unit 18 can obtain (such as via a mode notification signal or a domain mode tag) compression mode on which compression of downlink signal data is based from the baseband processing unit 20. In an example, in response to frequency domain compression mode, the decompression unit 17 decompresses downlink signal in frequency domain in a manner as described with reference to FIG. 4, and transmits decompressed frequency domain signal to the inverse transformation unit 18 to perform inverse transformation to time domain. While in response to time domain compression mode, the decompression unit 17 first decompresses downlink signal data in time domain, then bypasses the inverse transformation unit 18 and directly transmits the decompressed time domain signal to the DAC 14 and the transmitter 13 for transmission related processing.

In another example, configuration of the inverse transformation unit 18 is modified such that it conditionally transforms downlink signal. Thus, in response to frequency domain compression mode, the inverse transformation unit 18 conducts transformation from frequency domain to time domain in a manner as described with reference to FIG. 4. In response to time domain compression mode, the inverse transformation unit 18 directly forwards downlink signal in time domain to the subsequent unit without conducting time domain transformation.

By adding the above domain determination unit 19 and making corresponding modification to other units, the radio unit 10 can switch between both frequency domain compression mode and time domain compression mode at proper time, thereby further increasing total compression efficiency of uplink signal data.

Figure 5B:
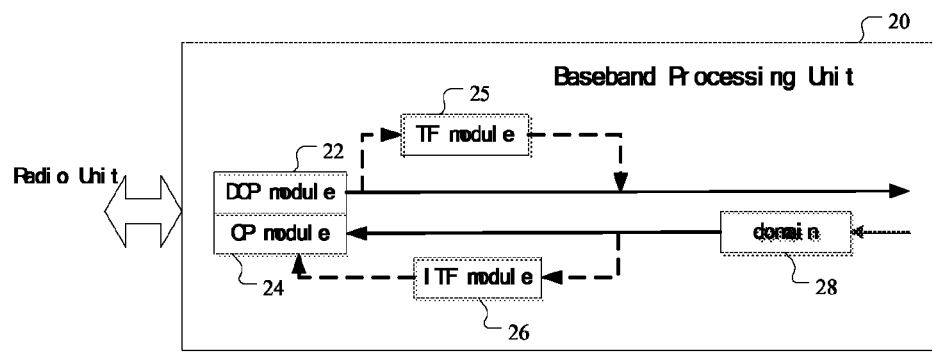
FIG. 5B shows a structural diagram of a baseband processing unit according to an embodiment of the invention.

Corresponding to the modification to the radio unit 10, FIG. 5B shows a structural diagram of a baseband processing unit according to an embodiment of the invention. As compared to the baseband processing unit in FIG. 4, in the example of FIG. 5B, the baseband processing unit 20 further comprises a transformation module 25, an inverse transformation module 26 and a domain determination module 28 to adapt to different compression modes.

Specifically, as to uplink signal data, the decompression module 22 not only obtains compressed uplink data from the radio unit 10, but also obtains compression mode on which compression of uplink data is based via a mode notification signal or a domain mode tag, for example. In one embodiment, in response to frequency domain compression mode, the decompression module 22 decompresses uplink signal in frequency domain in a manner as described with reference to FIG. 4, and the decompressed signal in frequency domain is directly used in subsequent baseband processing. While in response to time domain compression mode, the decompression module 22 firstly decompresses uplink signal data in time domain, then transmits it to the transformation module 25 to execute transformation from time domain to frequency domain. After conducting domain transformation on uplink signal data, the transformation module 25 transmits it to the subsequent units for baseband processing.

In another example, the decompression module 22 always transmits uplink data to the transformation unit 25; however, the transformation unit 25 conditionally transforms the uplink data based on compression mode. Specifically, in response to frequency domain mode, the transformation unit 25 directly transmits uplink signal data to the subsequent units for baseband processing without conducting frequency domain transformation; in response to time domain mode, the transformation unit 25 conducts time domain to frequency domain transformation on the obtained uplink signal data, then transmits it to the subsequent units for baseband processing.

As to downlink signal data, after baseband processing, the domain determination module 28 determines compression mode on which compression of downlink signal data is based. In one embodiment, the domain determination module 28 estimates compression ratio of its obtained downlink signal data in frequency domain, and determines compression mode based on the estimated compression ratio. In one embodiment, the compression module 24 provides feedback of actual compression ratio to the domain determination module 28, and the domain determination module 28 conducts domain mode determination based on the estimated compression ratio in frequency domain and feedback of actual compression mode.

The domain determination module 28 may conduct determination of compression mode in a manner similar to the domain determination unit 19 in the radio unit, except that the domain determination unit 19 directly obtains uplink signal in time domain and thus estimates compression ratio in time domain, while the domain determination module 28 directly obtains downlink signal in frequency domain and thus estimates compression ratio in frequency domain. It is appreciated that, due to relative independence of uplink and downlink, the domain determination module 28 in the baseband processing unit 20 and the domain determination unit 19 in the radio unit 10 conduct determination of compression mode independently with each other. Therefore, the manner in which the domain determination module 28 determines compression mode of downlink signal data may be same as or different from the manner in which the domain determination unit 19 within the radio unit 10 determines compression mode of uplink signal data.

Further, in response to different compression mode determined by the domain determination module 28, respective units for downlink data conduct different operations. In an example, in response to time domain compression mode, the domain determination module 28 firstly transmits downlink data in frequency domain to the inverse transformation module 26, so as to conduct time domain transformation on the downlink data by the inverse transformation module 26. Then, the transformed downlink signal data in time domain is transmitted to the compression module 24. Accordingly, the compression module 24 compresses the obtained downlink signal data in time domain. In response to frequency domain compression mode, the domain determination module 28 directly transmits downlink data in frequency domain to the compression module 24 and bypasses the inverse transformation module 26.

In another example, the domain determination module 28 always transmits downlink data to the inverse transformation module 26; however, the inverse transformation module 26 conditionally transforms the downlink data based on compression mode. Specifically, in response to time domain compression mode, the inverse transformation module 26 conducts frequency domain to time domain transformation on downlink signal data as described above. In response to frequency domain compression mode, the inverse transformation module 26 directly forwards downlink frequency domain signal to the compression module 24 without conducting time domain transformation.

By adding the above domain determination module 28, transformation module 26 and inverse transformation module 26, the baseband processing unit 20 can switch between frequency domain compression mode and time domain compression mode at proper time, thereby further increasing total compression efficiency of downlink signal data.

The radio unit 10 in FIG. 5A and the baseband processing unit 20 in FIG. 5B can, by cooperating with each other, achieve higher total compression efficiency for both uplink signal data and downlink signal data, thereby further reducing communication pressure on transmission links.

Based on a same inventive conception, the present invention also provides a method for processing uplink signal data in a base station system and a method for processing downlink signal data in a base station system.

Figure 6A:
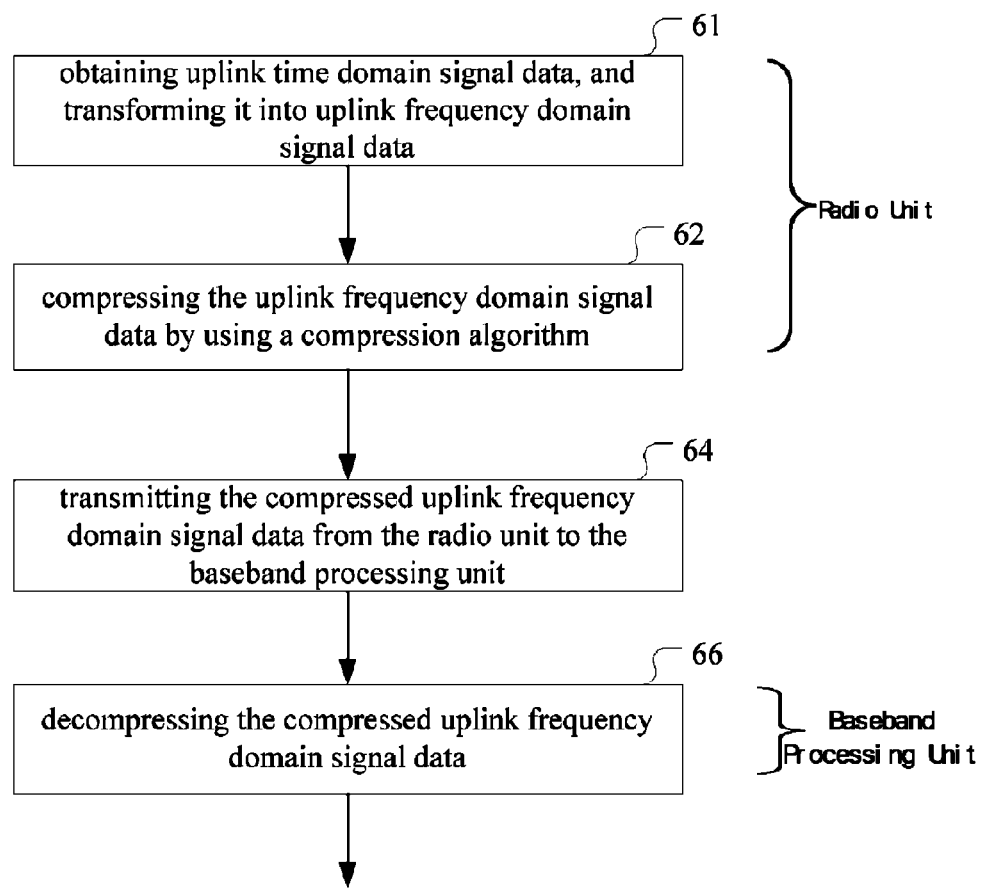
FIG. 6A shows a flowchart of a method for processing uplink signal data in a base station system according to an embodiment of the invention.

FIG. 6A shows a flowchart of a method for processing uplink signal data in a base station system according to an embodiment of the invention, wherein the base station system comprises a radio unit and a baseband processing unit. As shown in FIG. 6A, the method comprising: step 61, obtaining, in the radio unit, uplink time domain signal data, and transforming it into uplink frequency domain signal data; step 62, compressing, in the radio unit, the uplink frequency domain signal data by using a compression algorithm; step 64, transmitting the compressed uplink frequency domain signal data from the radio unit to the baseband processing unit; and step 66, decompressing, in the baseband processing unit, the compressed uplink frequency domain signal data.

Figure 6B:
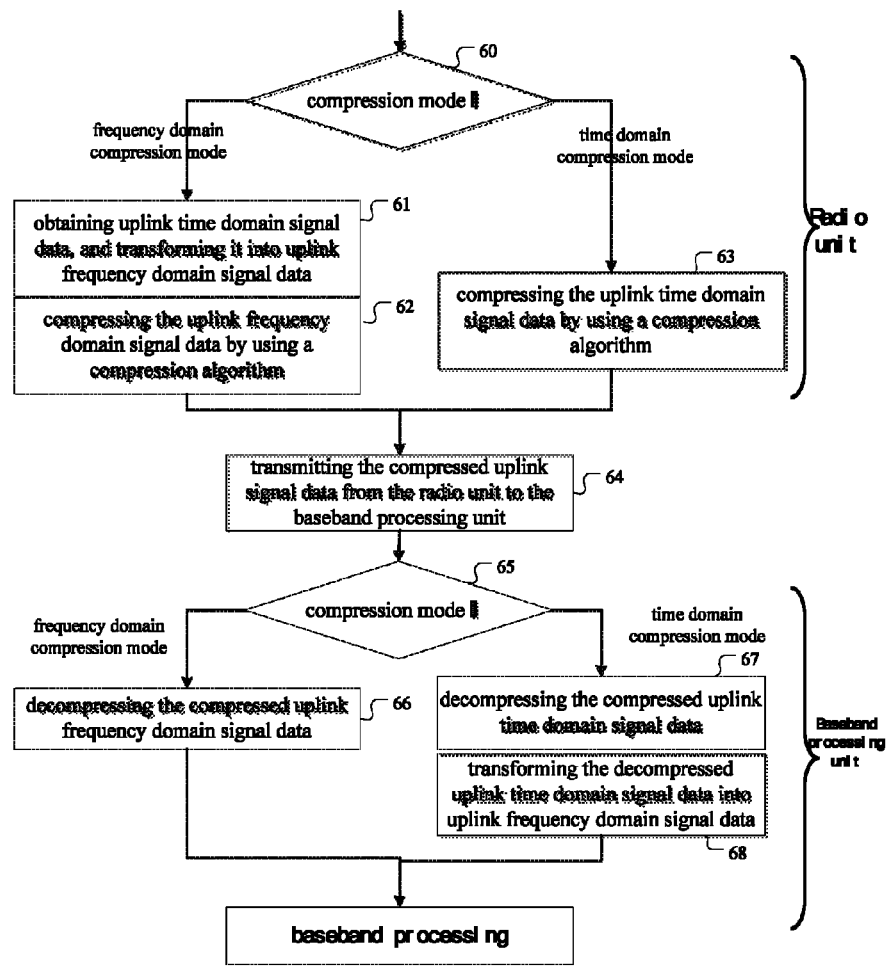
FIG. 6B shows a flowchart of a method for processing uplink signal data in a base station system according to another embodiment of the invention.

Further, on basis of the method shown in FIG. 6A, FIG. 6B shows a flowchart of a method for processing uplink signal data in a base station system according to another embodiment of the invention. The method of FIG. 6B further comprising: step 60, determining, in the radio unit, compression mode of the uplink signal data; and step 65, determining, in the baseband processing unit, compression mode of the uplink signal data. In response to frequency domain compression mode, the foregoing steps 61-62 are executed in the radio unit, and the foregoing step 66 is executed in the baseband processing unit. However, in response to time domain compression mode, step 63 is executed in the radio unit, that is, compressing the uplink time domain signal data by using a compression algorithm. Next, at step 64, the compressed uplink time domain signal data is transmitted to the baseband processing unit. In the baseband processing unit, in response to determination result of time domain compression mode of step 65, steps 67 and 68 are executed. In step 67, the compressed uplink time domain signal data is decompressed, and in step 68, the decompressed uplink time domain signal data is transformed into uplink frequency domain signal data.

Figure 7A:
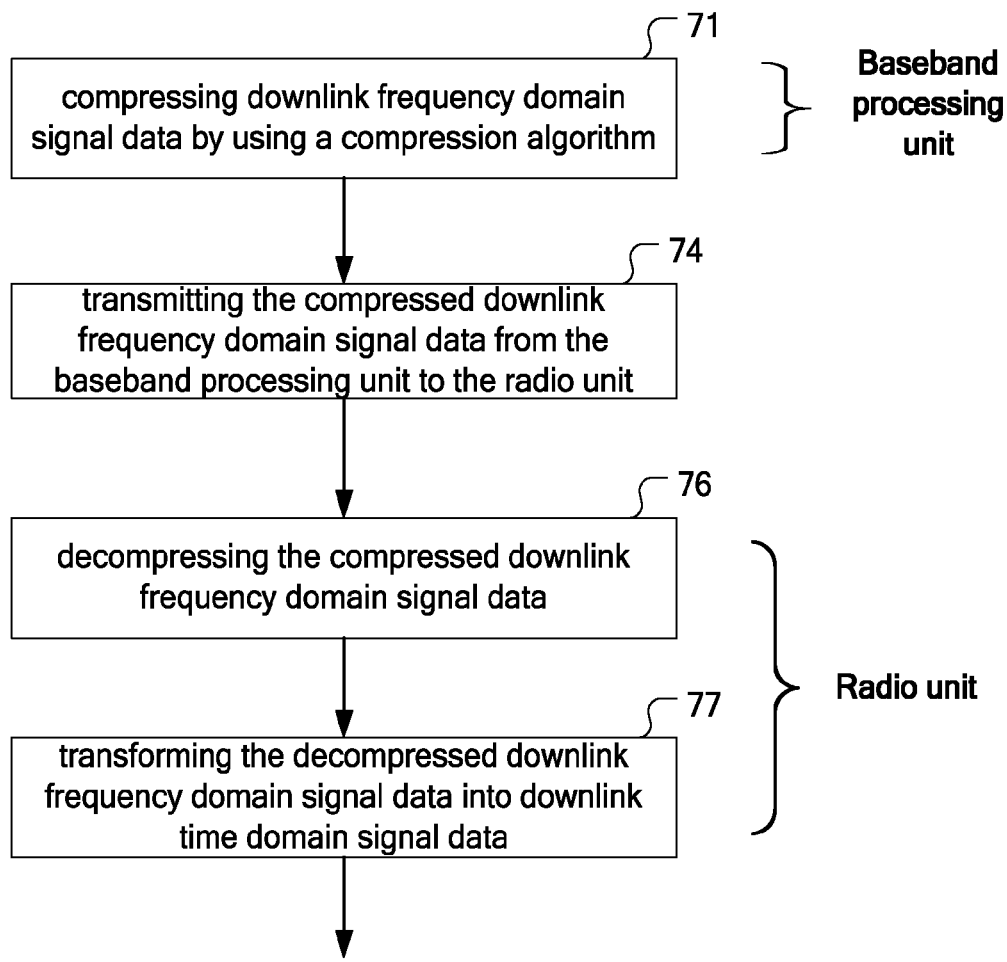
FIG. 7A shows a flowchart of a method for processing downlink signal data in a base station system according to an embodiment of the invention.

Corresponding to the processing of uplink data, FIG. 7A shows a flowchart of a method for processing downlink signal data in a base station system according to an embodiment of the invention, wherein the base station system comprises a radio unit and a baseband processing unit. As shown in FIG. 7A, the method comprising: step 71, compressing, in the baseband processing unit, downlink frequency domain signal data by using a compression algorithm; step 74, transmitting the compressed downlink frequency domain signal data from the baseband processing unit to the radio unit; step 76, decompressing, in the radio unit, the compressed downlink frequency domain signal data; and step 77, transforming, in the radio unit, the decompressed downlink frequency domain signal data into downlink time domain signal data.

Figure 7B:
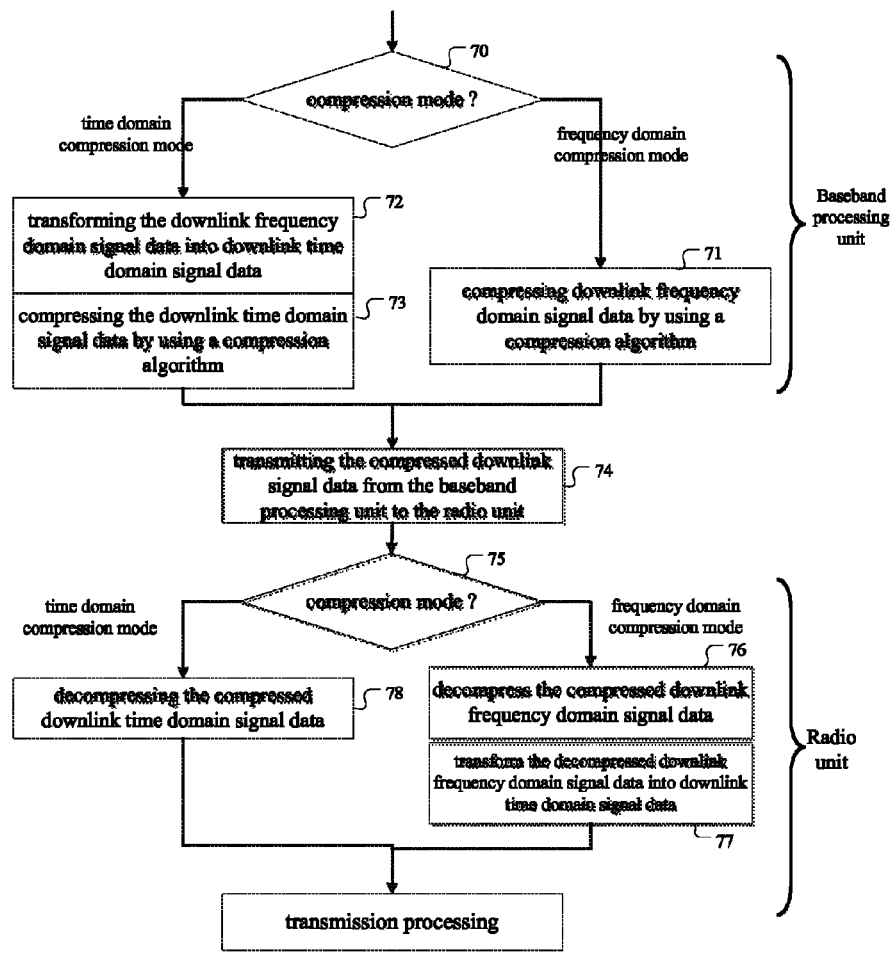
FIG. 7B shows a flowchart of a method for processing downlink signal data in a base station system according to another embodiment of the invention.

Further, on basis of the method shown in FIG. 7A, FIG. 7B shows a flowchart of a method for processing downlink signal data in a base station system according to another embodiment of the invention. The method of FIG. 7B further comprising: step 70, determining, in the baseband processing unit, compression mode of the downlink signal data; and step 75, determining, in the radio unit, compression mode of the downlink signal data. In response to frequency domain compression mode, the foregoing step 71 is executed in the baseband processing unit, and the foregoing steps 76-77 are executed in the radio unit. However, in response to time domain compression mode, steps 72-73 are executed in the baseband processing unit. Specifically, in step 72, the downlink frequency domain signal data is transformed into downlink time domain signal data, and in step 73, the downlink time domain signal data is compressed by using a compression algorithm. Next, at step 74, the compressed downlink time domain signal data is transmitted to the radio unit. In the radio unit, in response to determination result of time domain compression mode of step 75, step 78 is executed, that is, decompressing, in the radio unit, the compressed downlink time domain signal data.

For detailed execution manner of FIG. 6A and FIG. 7A, reference may be made to the detailed description made with respect to FIG. 4, and for detailed execution manner of FIG. 6B and FIG. 7B, reference may be made to the detailed description made with respect to FIG. 5, which will be omitted here for brevity.

With the embodiments of the invention, what is transferred between a radio unit and a baseband processing unit is signal data that has been effectively compressed, such that data traffic transmitted is significantly decreased and communication pressure on transmission links is reduced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for processing uplink signal data in a base station system, the base station system comprising a radio unit and a baseband processing unit, the method comprising:

obtaining, in the baseband processing unit, compressed uplink signal data from the radio unit, determining by the baseband processing unit a compression mode of the compressed uplink signal data, and selectively decompressing, in the baseband processing unit, the compressed uplink signal data into baseband processed downlink frequency domain signal data based on the compression mode of the compressed uplink signal data; and obtaining the baseband processed downlink frequency domain signal data, compressing the downlink frequency domain signal data according to a compression mode by using a first compression algorithm;

generating a feedback signal indicating an actual compression ratio resulting from compressing the downlink frequency domain signal data;

dynamically controlling the compression mode based on a comparison between the actual compression ratio indicated by the feedback signal and the estimated compression ratio, and transmitting the compressed downlink frequency domain signal to the radio unit when the actual compression ratio is greater than or equal to the estimated compression ratio, and transforming the downlink frequency domain signal data back into downlink time domain signal data and compressing the downlink time domain signal data by using a second compression algorithm when the actual compression ratio is less than the estimated compression ratio;

decompressing, in the radio unit, the compressed downlink frequency domain signal data or the compressed downlink time domain signal data.

2. The method of claim 1, further comprising:

determining the compression mode of the downlink signal data, the compression mode comprising a time domain compression mode and a frequency domain compression mode.

3. The method of claim 2, determining the compression mode based on at least one of: an estimation of compression ratio of the downlink frequency domain signal data; and an actual compression ratio feedback from a compression module.

4. The method of claim 2, further comprising indicating the compression mode via at least one of the following manners: sending a mode notification signal; and adding a domain mode tag in the downlink frequency domain signal data.

5. The method of claim 2, further comprising transmitting the downlink frequency domain signal data to an inverse transformation module in response to the time domain compression mode, and inversely transforming the downlink frequency domain signal data into the downlink time domain signal data according to the second compression algorithm.

6. The method of claim 2, wherein when invoking the time domain compression mode, inversely transforming the downlink frequency domain signal data into the downlink time domain signal data according to the second compression algorithm, and wherein invoking the frequency domain compression mode, transmitting the downlink frequency domain signal data directly to a compression module.

7. The method of claim 1, further comprising transforming the uplink signal data into uplink frequency domain signal data, obtaining a mode notification signal indicating the compression mode of uplink signal data, transmitting decompressed uplink signal data to a transformation module in response to determining the compression mode of the uplink signal data is a time domain compression mode, and generating the decompressed uplink signal data that bypasses the transformation module in response to determining the compression mode of the uplink signal data is a frequency domain compression mode.

8. The method of claim 1, further comprising obtaining a mode notification signal indicating the compression mode of the uplink signal data, transforming decompressed uplink signal data into uplink frequency domain signal data in response to determining the compression mode of the uplink signal data is a time domain compression mode, and directly outputting the decompressed uplink signal data without performing transformation in response to determining the compression mode of the uplink signal data is a frequency domain compression mode.

* * * * *